US009064453B2

(12) United States Patent
Mahowald

(10) Patent No.: US 9,064,453 B2
(45) Date of Patent: *Jun. 23, 2015

(54) COMMUNICATION USING LIGHT-EMITTING DEVICE

(71) Applicant: Apple Inc., Cupertino, CA (US)

(72) Inventor: Peter Henry Mahowald, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,267

(22) Filed: Jan. 6, 2014

(65) Prior Publication Data
US 2014/0118233 A1 May 1, 2014

Related U.S. Application Data

(63) Continuation of application No. 11/947,707, filed on Nov. 29, 2007, now Pat. No. 8,624,809.

(51) Int. Cl.
G09G 3/32 (2006.01)
G09G 5/00 (2006.01)
G06F 11/32 (2006.01)

(52) U.S. Cl.
CPC ............ *G09G 3/3208* (2013.01); *G06F 11/325* (2013.01); *G09G 2330/02* (2013.01)

(58) Field of Classification Search
CPC ................ G09G 2320/0633; G09G 2320/064; G09G 2320/0646; G09G 2320/0653; G09G 3/32; G09G 3/3208; G09G 3/14
USPC ........ 345/156–178, 82, 83; 715/772; 455/566
See application file for complete search history.

(56) References Cited

U.S. PATENT DOCUMENTS

| 5,793,304 | A | 8/1998 | Sone |
| 5,921,674 | A | 7/1999 | Koczi |
| 6,658,577 | B2 | 12/2003 | Huppi et al. |
| 6,792,294 | B1 | 9/2004 | Kushita |
| 2002/0086711 | A1 | 7/2002 | Flannery |
| 2002/0132639 | A1 | 9/2002 | Sato |
| 2002/0158922 | A1 | 10/2002 | Clark et al. |
| 2003/0017823 | A1 | 1/2003 | Mager et al. |
| 2004/0263494 | A1 | 12/2004 | Poor et al. |
| 2007/0129006 | A1 | 6/2007 | Goldberg et al. |

*Primary Examiner* — Stephen Sherman
(74) *Attorney, Agent, or Firm* — Fish & Richardson P.C.

(57) ABSTRACT

Methods, systems, and apparatus, including computer program products, for communicating information. An event is detected. A light effect is emitted in response to the detected event. The emitted light effect simulates the detected event or a sensory output associated with the detected event.

24 Claims, 8 Drawing Sheets

COMMUNICATION USING LIGHT-EMITTING DEVICE

CROSS-REFERENCE TO RELATED APPLICATION

This application is a continuation application of and claims priority to U.S. application Ser. No. 11/947,707, entitled "Communication Using Light-Emitting Device," filed on Nov. 29, 2007, the entire contents of which is hereby incorporated by reference for all purposes.

BACKGROUND

This specification is related generally to user interfaces.

A computer can include one or more indicators (e.g., lights, light emitting diodes, etc) for providing a status of the computer. A computer can have, for example, a light for conveying information related to the power on/off status, a light for indicating hard disk drive activity, and a light for indicating whether the computer is in "sleep" mode. Generally, the light is operated such that it conveys binary information: power is on or off; there is hard disk drive activity or not; the computer is in sleep mode or not, for example.

SUMMARY

In general, one aspect of the subject matter described in this specification can be embodied in methods that include the actions of detecting an event that includes an associated sensory output, and, in response to the detected event, emitting a light effect that simulates the sensory output. Other embodiments of this aspect include corresponding systems, apparatus, computer program products, and computer readable media.

In general, another aspect of the subject matter described in this specification can be embodied in methods that include the actions of detecting an event, and, in response to the detected event, emitting a light effect that simulates the detected event. Other embodiments of this aspect include corresponding systems, apparatus, computer program products, and computer readable media.

Particular embodiments of the subject matter described in this specification can be implemented to realize one or more of the following advantages. Information can be communicated to a user using a light-emitting device. A light-emitting device can emit a visually pleasing light effect when particular events or sensory outputs occur. A device with only light-emitting indicator devices can share user interface features with devices that utilize displays for ease of use mnemonics and branding. A light-emitting device can provide at-a-glance information that is less likely to distract a user than detailed information displayed on a display (e.g., when the light-emitting device is used on an automobile dashboard).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
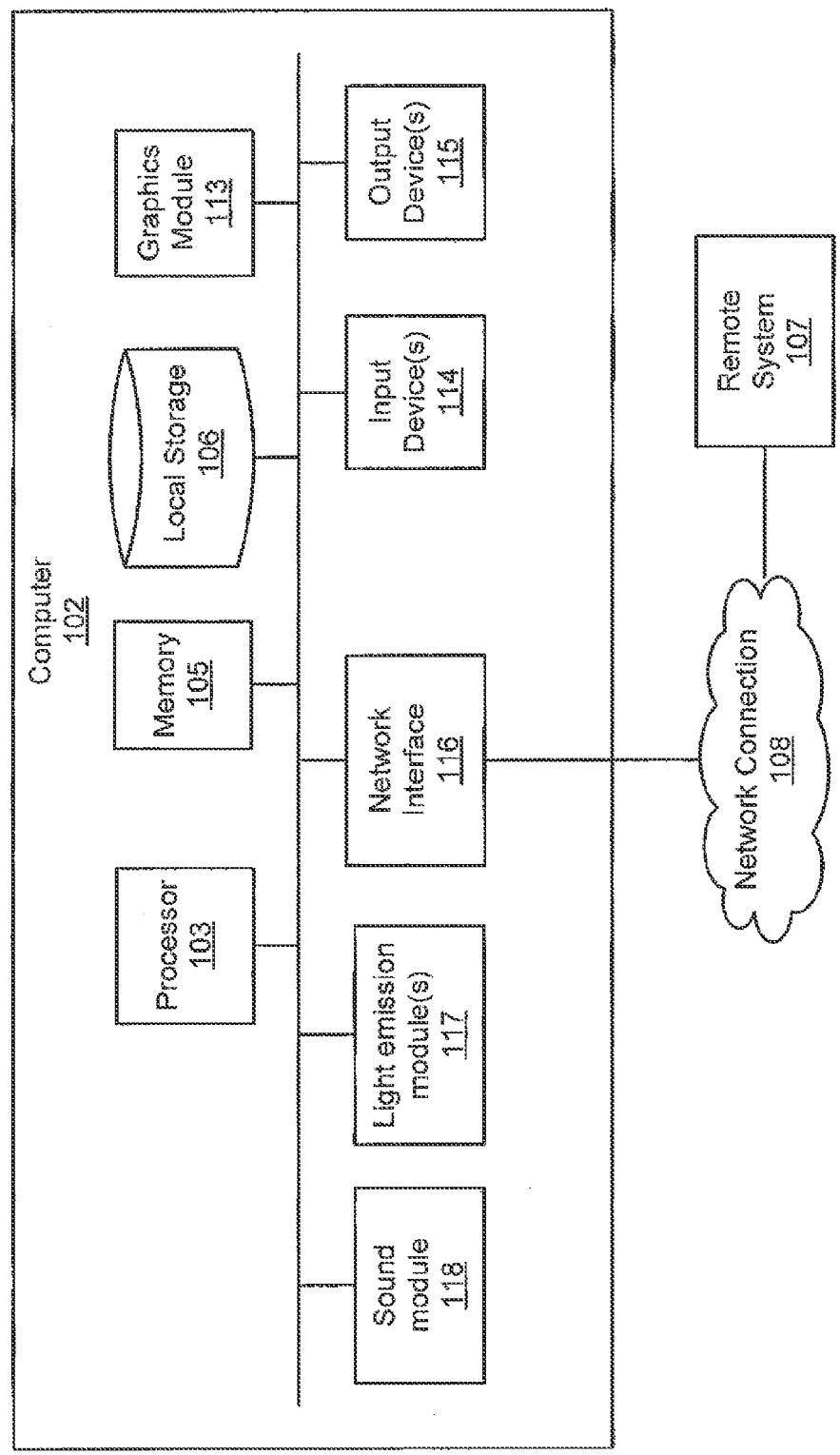
FIG. 1 is a block diagram illustrating an example computer system.

FIG. 1 is a block diagram of a computer system 100 operable to communicate using light effects (e.g., blinking light, a light with varying intensity (i.e., brightness) over time, etc.). In some implementations, the system 100 includes a personal computer ("computer") 102. The computer 102 is optionally communicatively coupled to a remote server 107 or other computer system using a network interface 116 and a network 108 (e.g., local area network, wireless network, Internet, intranet, etc.). The computer 102 includes a processor 103 and memory 105. In some implementations, the computer 102 includes one or more input devices 114 (e.g., keyboard, mouse, buttons, etc.) and one or more output devices 115 (e.g., a display device). A user can interact with the computer system 100 using the input and output devices 114 and 115, respectively.

In some implementations, the computer 102 also includes a local storage device 106 and a graphics module 113 (e.g., graphics card) for storing information and generating graphics for display on a display device, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

The computer 102 includes one or more light emission modules 117 and optionally a sound module 118. In some implementations, a light emission module 117 includes one or more light emission devices (e.g., a light-emitting diode (LED)) and associated circuitry for generating various light effects by affecting the emission of light through the LED. The sound module 118 (e.g., a sound card, a sound chip, sound output circuitry) outputs audio to a speaker, headphones, amplifier, or the like (not shown).

In some implementations, the light emission module 117 is located on a device that is external to, and coupled to, the computer 102. For example, the light emission module 117 can be located on a Universal Serial Bus (USB) Flash drive or memory stick, which can be connected to the computer 102 through an interface port (not shown). As another example, the light emission module 117 can be located on a wireless router or access point communicatively coupled to the computer 102.

While communication using light emission is described in this specification with respect to a personal computer 102, it should be apparent that the disclosed implementations can be incorporated in, or integrated with, any electronic device that has a light emission device, including without limitation, portable and desktop computers, servers, electronics, media players, game devices, mobile phones, smart phones, email devices, personal digital assistants (PDAs), embedded devices, televisions, other consumer electronic devices, set top boxes, storage devices, medical or health devices, on-board systems in automobiles, appliances, etc. In some implementations, the system 100 or electronic device can omit a sound module 118 and/or a display device.

One of ordinary skill in the art will recognize that the engines, methods, processes and the like that are described can themselves be an individual process or application, part of an operating system, a plug-in, an application, or the like. In some implementations, the system and methods can be implemented as one or more plug-ins that are installed and run on the personal computer 102. The plug-ins are configured to interact with an operating system (e.g., MAC OS X, WINDOWS XP, WINDOWS VISTA, LINUX, etc.) and to perform the various functions, as described with respect to FIGS. 2-6. A system and method for communication using a light emission module can also be implemented as one or more software applications running on the computer 102 and controlling a light emission module 117. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications or the operating system.

The computer 102 can store data items, such as files and other data objects, in the local storage device 106, for example. Examples of data items include documents, images or graphics, video clips, audio clips, and so forth.

Figure 2:
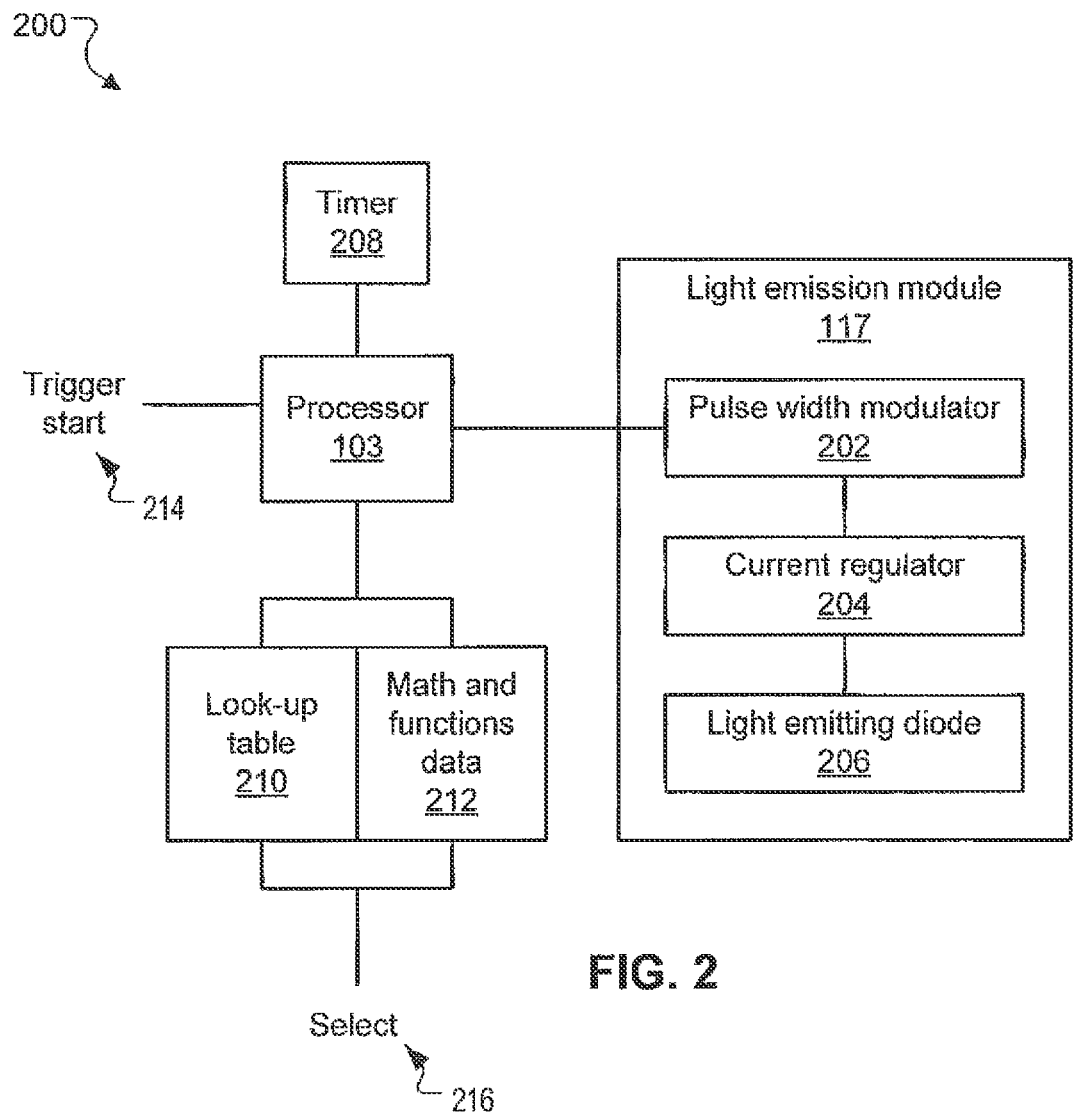
FIG. 2 is a block diagram illustrating an example system architecture for communication using a light emission module.

FIG. 2 is a block diagram illustrating an example system architecture 200 for communication using a light emission module. In some implementations, the system architecture 200 is implemented in a computer 102. In some implementations, the system architecture 200 includes the processor 103 and one or more light emission modules 117.

In some implementations, the light emission module 117 includes a pulse width modulator 202, a current regulator 204, and a light-emitting diode (LED) 206. The LED 206 can emit light. The current regulator 204 regulates the amount of current supplied to the LED 206; the intensity of the light emitted by the LED 206 is based, generally, on the amount of current supplied to the LED 206. The pulse width modulator 202 receives signals from the processor 103 and modulates the electrical pulses flowing to the current regulator 204. Thus, the processor controls the emission of light by the LED 206 through the pulse width modulator 202 and the current regulator 204. An example of using a pulse width modulator to affect the intensity of the light emitted by the LED is disclosed in U.S. Pat. No. 6,658,577, titled "Breathing Status LED Indicator," issued Dec. 2, 2003, which is incorporated by reference herein in its entirety.

The processor 103 controls the light emission module 117. For example, the processor 103 can control the light emission module 117 to emit a light that can change intensity at different rates or whose intensity remains steady. In some implementations, the processor 103 provides control signals to the light emission module 117 when particular events on the computer 102 are detected and/or when particular visual or audio outputs occur. For example, when a user is attempting to send an email message from the computer 102 (by selecting the send button in an email application) and a sending progress indication (e.g., a progress bar) is displayed on a display device of the computer 102, the processor 103 can signal the light emission module 117 to emit a light that gradually increases in intensity as the sending progresses until the email is successfully sent, when a light is to be emitted at a steady intensity.

In some implementations, the processor 103 signals the light emission module 117 to emit light such that the intensity of the emitted light varies with some event or sensory (e.g., visual, audio) output. In some implementations, intensity values can be predetermined and stored in the local storage 106 or memory 105 for retrieval. For example, the architecture 200 can include one or more look-up tables 210 and/or math and function data 212. In some implementations, the look-up table 210 and the math/function data 212 are stored in the local storage 106 or memory 105. The look-up table 210 and the math/function data 212 can be stored in its own dedicated storage or memory, or stored with shared storage or memory with other data. The look-up table 210 can include intensity values for various states in events or visual/audio outputs. The math/function data 212 can include information on one or more mathematical functions that can be used to calculate intensity over time for various events or visual/audio outputs. The processor 103 can use the look-up table 210 and the math/function data 212 to determine a light intensity at a particular time and signal the light emitting module 117 to emit the light at the determined intensity.

In some implementations, the architecture 200 includes a timer 208. The timer 208 can be used to determine elapsed time for the processor 103. The processor 103 can use the elapsed time to determine the proper intensity for the emitted light. In some implementations, the timer 208 can be integrated into the processor 103.

In some implementations, the processor 103 can include a trigger start signal input 214 and the look-up table 210 and math/function data 212 include inputs for a selection signal 216. The trigger start signal 214 signals the processor 103 to begin signaling the light emission module 117 to emit light whose intensity follows a function or a set of values. The selection signal 216 selects the look-up table values or function to be used by the processor 103 to determine the proper intensity.

In some implementations, the architecture 200 includes multiple light emission modules 117. The processor 103 can control each of the light emission modules 117 and coordinate the emission of light from the multiple light emission modules 117 in order to emit light patterns and effects using multiple LEDs.

In some implementations, the light emission module 117 can be controlled by an external device or respond to inputs from an external device. For example, a computer 102 can control the light emission module of a USB Flash drive connected to the computer 102 through an interface port (e.g., a USB port).

Figure 3:
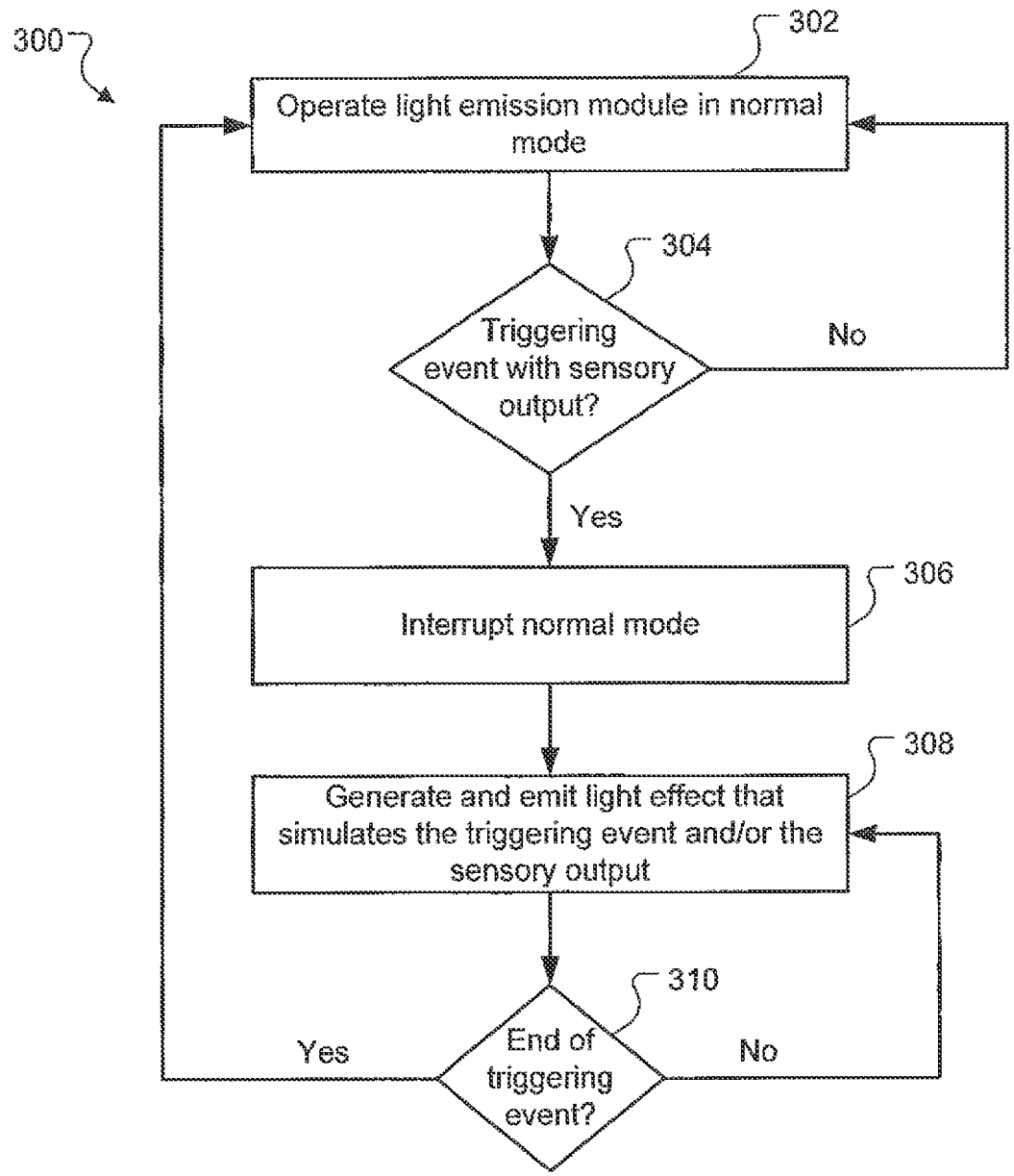
FIG. 3 is a flow diagram for an example process for communicating using a light emission module.

FIG. 3 is a flow diagram for an example process 300 for communicating using a light emission module. For convenience, the process 300 will be described in reference to a system (e.g., system 100) that performs the process.

A light emitting module is operated in normal mode (302). In normal operation, the light emission module 117 can be used by the system 100 to convey basic information, such as power status and hard drive activity. Alternatively, the light emission module 117 can be dormant until a particular associated activity is initiated.

In some implementations, the system 100 includes multiple light emission modules 117. Each of the light emission modules 117 can be assigned to convey particular information in normal mode. For example, one light emission module can be assigned to be the power on/off indicator, another light emission module can be assigned to be the hard drive activity indicator, and yet another light emission module can be assigned to be the sleep status indicator.

A triggering event is detected by the system 100 (304). A triggering event can be any of a variety of particular events that can occur on the system 100. A triggering event can be a user event (i.e., an event initiated by a user or an event that occurs in response to a user input) or a system event, for example. Examples of triggering events include changing of compact disks (CD), Digital Versatile Disks (DVD), or other optical disk media in a multi-disk changer; initiation by the user of a task (e.g., system boot-up, initiation of a backup operation, insertion of an optical disk, initiation of a synchronization operation, insertion of a Universal Serial Bus (USB) drive into an interface port, loading an application, a file transfer (e.g., copy, move, synchronization, download, upload), sending of an email message, search in a search engine, wireless network discovery, attempted entry of a password, etc.); the opening of a door of an automobile; shuddering of anti-lock brakes of an automobile; and so on.

In some implementations, the triggering event includes an associated sensory output. The sensory output can include a visual output displayed on a display device of the computer 102 (e.g., an on-screen dynamic or animation associated with the triggering event) and/or an audio output (e.g., a sound effect or pattern associated with the triggering event). As used in this specification, an on-screen dynamic is a set of variations or changes in what is displayed on a display device. For example, if the triggering event is a loading of an application by the user clicking on an icon corresponding to the application, the on-screen dynamic can be the icon bouncing up and down. As another example, if the triggering event is a file search, the on-screen dynamic can be a bar swaying back and forth to indicate that the search is ongoing.

If a triggering event is not detected (304—No), the light emission module continues to be operated in normal mode.

If a triggering event is detected (304—Yes), the normal mode of the light emission module is interrupted (306) and the light emission module is operated in event mode (308). While in event mode, the light emission module is operated to emit a light effect that simulates or is otherwise related to the detected triggering event and/or the sensory output (e.g., an on-screen dynamic; a sound effect) associated with the triggering event; the emitted light effect has characteristics (e.g., relative amplitude of intensity, rate of change in intensity, period of oscillation in intensity, etc.) that are similar to characteristics of the triggering event or sensory output. For example, the light effect can change intensity in an oscillating manner with a period that is the same as some oscillatory period of the triggering event or sensory output. The similarity between the characteristics of the light effect and characteristics of the triggering event/sensory output can give a user viewing the light effect hints of what the triggering event or sensory output is, facilitating identification of the triggering event or sensory output by the user.

In some implementations, while the triggering event and/or the sensory output are in progress (310—No), the light emission module continues to operate in event mode. When the triggering event and/or the sensory output end (310—Yes), the light emission module is operated in normal mode. Alternatively, the light emission modules can be active for a predetermined amount of time or as long as proscribed by data provided by the system.

During event mode, a light emission module 117 is operated to emit a light effect that simulates a sensory output associated with the triggering event or is otherwise related to the triggering event. The light effect includes an emission of light that is emitted with changes in the intensity of the light and other effects (e.g., change in the color of the light). In some implementations, the intensity of the light over time, the rate of change in intensity over time, the color of the light, and other characteristics of the emitted light are patterned to simulate characteristics of the sensory output or the triggering event. For example, if the sensory output or the triggering event involves some sort of oscillation, the intensity of the light effect changes to simulate the oscillation. Thus, while the light emission module 117 operates in event mode, the emitted light can exhibit varying behavior (e.g., changes in intensity or color, blinking, varying speeds of blinking or changes in intensity, etc.) depending on the particular triggering event or sensory output.

For example, if the triggering event is the sending of an email, accompanied by a progress bar displayed on a display, the light emission module can begin emitting light when the user hits the send button in the email application. The intensity of the light increases with the progress shown in the progress bar until the sending is completed, when the intensity of the light reaches peak intensity and can remain on for some time (e.g., 3 seconds). As another example, if the triggering event is an incorrect password entered into a password dialog box, accompanied by a jiggle or shaking animation of the password dialog box, the light emission module can emit a light that blinks in a manner that simulates the jiggle/shaking animation.

As a further example, on an automobile, a sound effect can be emitted when a door of the automobile is ajar. A light emission module on the automobile can emit a light effect whose intensity simulates the sound effect.

In some implementations, the emitted light effect simulates a triggering event that does not have an associated visual output displayed on a display or an audio output from a sound module. For example, an automobile can have an on-board system that monitors the brakes on the automobile and which includes a light emission module 117. If the brakes shudder, the automobile on-board system detects the shuddering, and the light emission module 117 can be instructed by the automobile on-board system to emit a light effect whose intensity changes with the shuddering. As another example, a light emission module on a wireless router can emit a light effect that simulates the handshaking communication (e.g., data transmissions, the processing between data transmissions, etc.) between a wireless device and the router as the wireless device attempts to gain access to a wireless network through the router.

In some implementations, the triggering event and/or sensory output occurs on one device and the light effect simulating the sensory output is emitted from another device. For example, when a USB Flash drive is coupled to the system 100 through a USB port and a file is transferred between the USB drive, the USB drive can emit a light effect that simulates the on-screen dynamic of a progress bar indicating the progress of the transfer.

Figure 4:
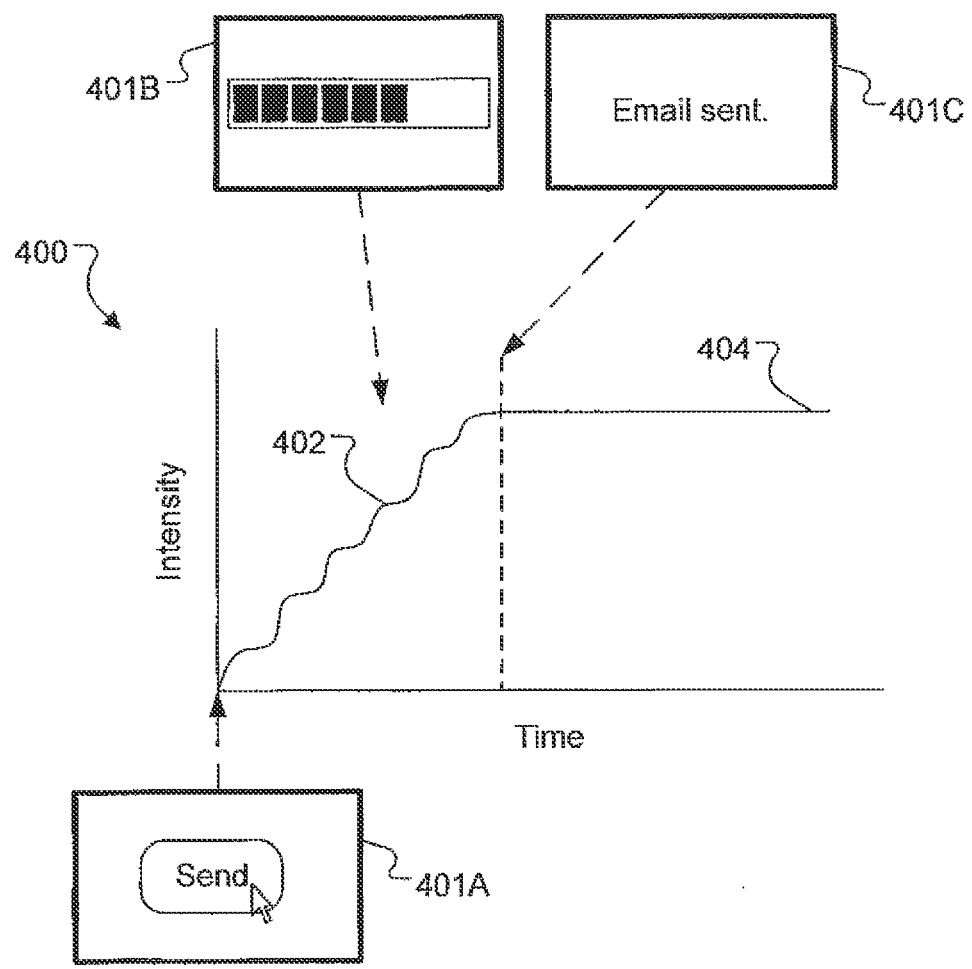
FIG. 4 illustrates an example intensity versus time graph for a light effect where the triggering event is a user-initiated email transmission.

FIG. 4 illustrates an example graph of intensity versus time for a light effect where the triggering event is a user-initiated email transmission. In graph 400, the intensity begins a monotonic increase when a user-initiated email transmission is detected (e.g., when the user hits a send button in an email application, as illustrated by a selected "send" button 401A) and a progress bar 401B is displayed. The progress bar can include multiple segments. In some implementations, the light effect simulates the progress bar; the light increases in intensity with each additional segment displayed in the progress bar, as illustrated by graph segment 402.

When the email transmission is complete (as illustrated by an "email sent" prompt 401C), the light intensity is steady for a period of time, as illustrated by segment 404. After the period of time has elapsed, the light emission module can return to normal mode of operation.

Figure 5A:
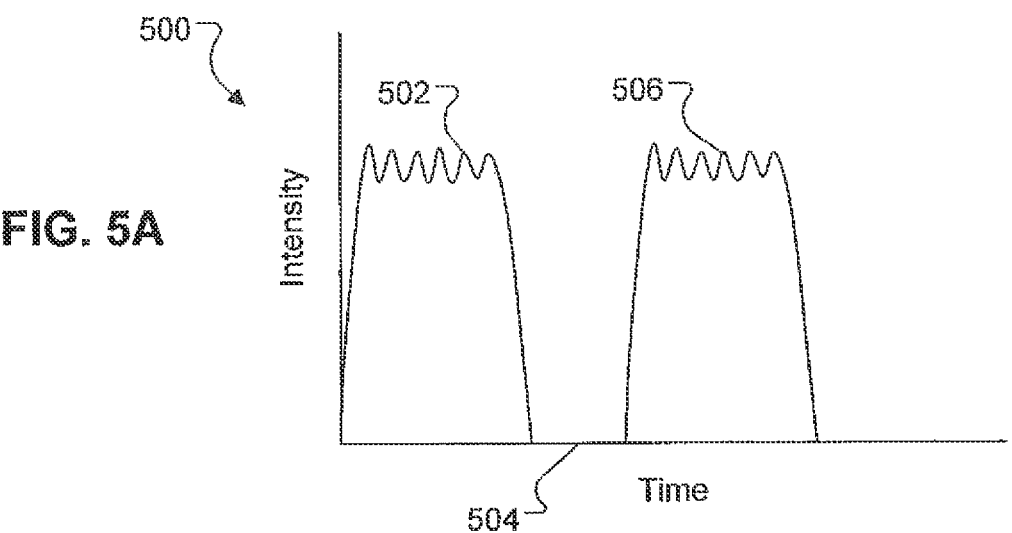
FIGS. 5A-5C illustrate example intensity versus time graphs for light effects where the triggering event is a data search or a discovery of in-range wireless networks.
Figure 5B:
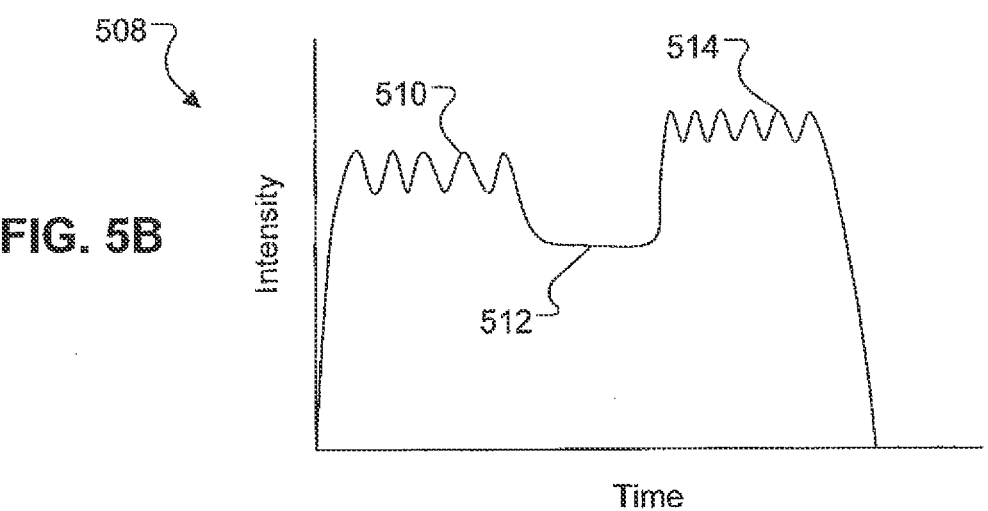
Figure 5C:
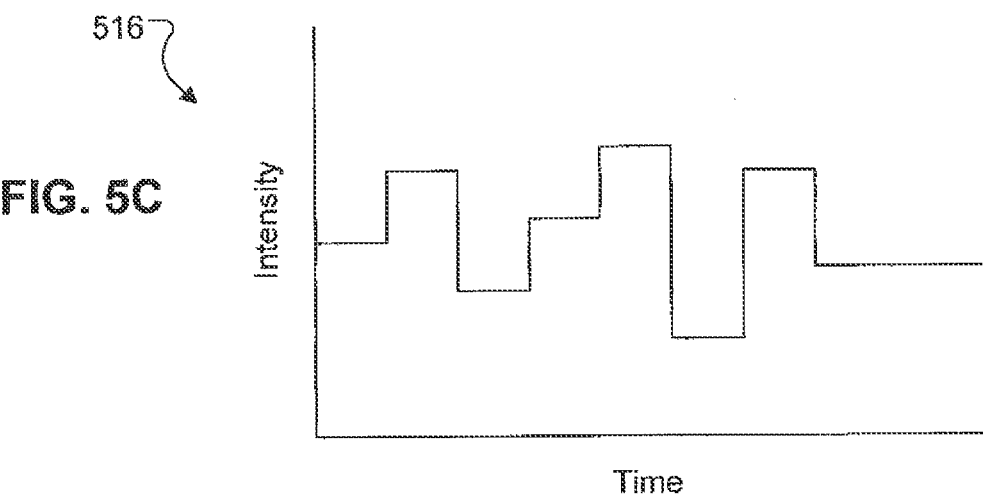

FIGS. 5A-5C illustrate example light intensity versus time graphs of light effects where the triggering event is a data search (e.g., a search for files in local storage 106 that match particular criteria) or a discovery of in-range wireless networks. Graph 500 shows intensity versus time with segments 502, 506 of fluttering intensity and a segment 504 of zero intensity (i.e., the light is off). Graph 508 shows intensity versus time with segments 510, 514 of fluttering intensity and a segment 512 of steady intensity. In some implementations, the fluttering can be based on a mathematical function (e.g., $e^{-t} \sin t+1$) of time. In some implementations, two fluttering segments in the light effect can be the same (e.g., segments 502 and 506) or different (e.g., segments 510, 514 flutter about different intensity levels). The segment of steady intensity can be one of zero intensity (e.g., segment 504) or a non-zero intensity (e.g., segment 512).

In some implementations, the fluttering segments can occur during parts of the data search where there is file access activity as a result of performing the search. In some other implementations, the fluttering segments can occur where there is attempted communication with a wireless network as part of the wireless network discovery process.

In some other implementations, the intensity versus time graph of the light effect for a data search or network discovery can include segments of different, but steady intensities, as illustrated by graph 516. The changing intensities can indicate the periods when the data search or the network discovery is in progress.

Figure 6:
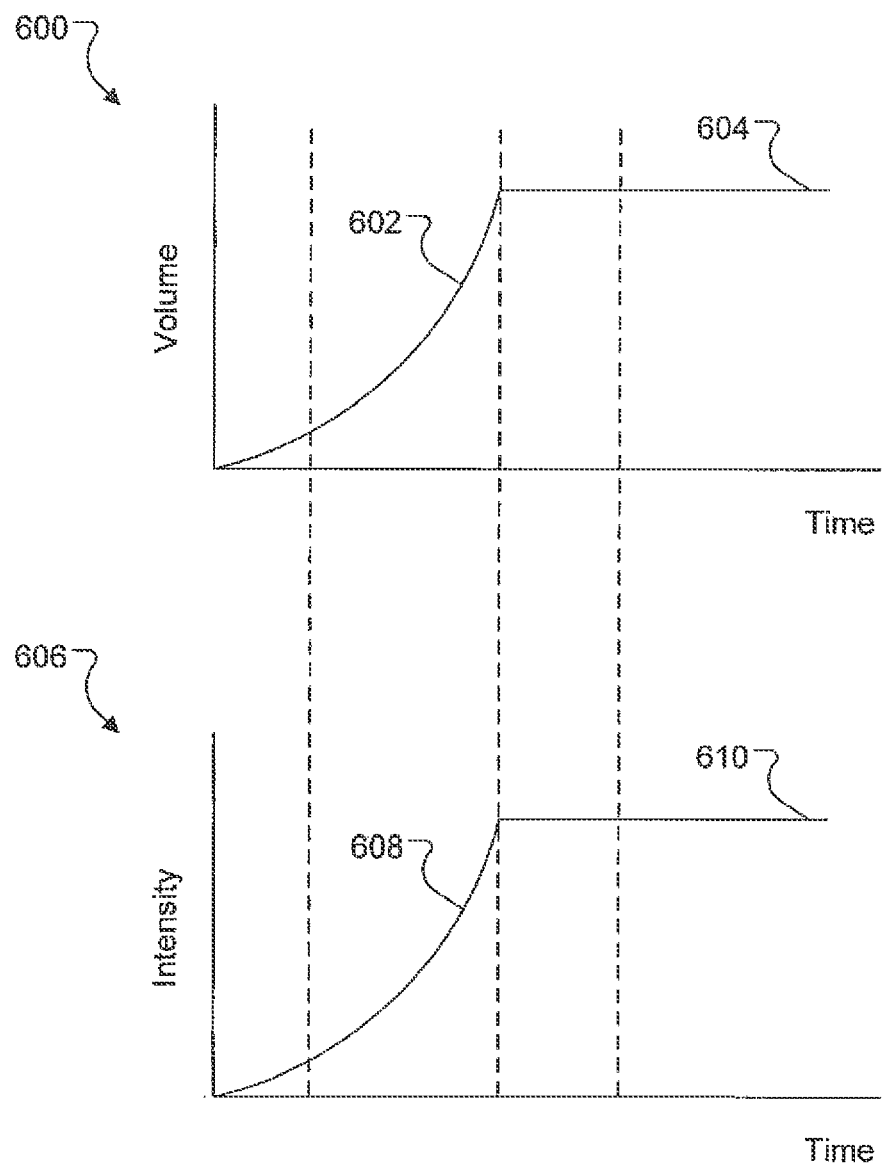
FIG. 6 illustrates an example graph of volume versus time and an example graph of light intensity versus time.

In some implementations, the light effect can simulate an audio output corresponding to the detected triggering event. For example, the relative intensity, rate of change in the intensity, color, etc. of the light emitted by the light emission module can be similar to the amplitude, volume, and/or frequency of the audio output from the sound module. FIG. 6 illustrates an example graph of volume versus time and an example graph of light intensity versus time. Graph 600 illustrates a graph of volume versus time. Graph 600 includes a segment 602 of monotonically increasing volume and a segment 604 of steady volume. Graph 606 illustrates a graph of intensity versus time in which the rate of change in intensity mimics the rate of change in volume in graph 600. Graph 606 includes a segment 608 of monotonically increasing intensity and a segment 610 of steady intensity. The intensity increases as the volume increases and remains steady as the volume remains steady.

In some implementations, multiple light emission modules can be operated in event mode. When multiple light emission modules are operated in event mode, the emission of light from the individual light emission modules can be coordinated to generate a patterned light effect that simulates or is otherwise related to the triggering event or sensory output in a way that provides hints as to what the event or sensory output is. For example, a computer 102 can have multiple LEDs lined up in a row. When a discovery for in-range wireless networks is initiated, the LEDs can emit light in sequence until the discovery is completed, at which point all of the multiple LEDs are to emit light. For example, if there are 5 LEDs A, B, C, D, and E, the sequence of the LED that is emitting light can be A, then B, then C, then D, then E, then D, then C, then B, then A, then B, and so on. When the network discovery is complete, all five LEDs A, B, C, D, and E are on and emitting light.

Figure 7A:
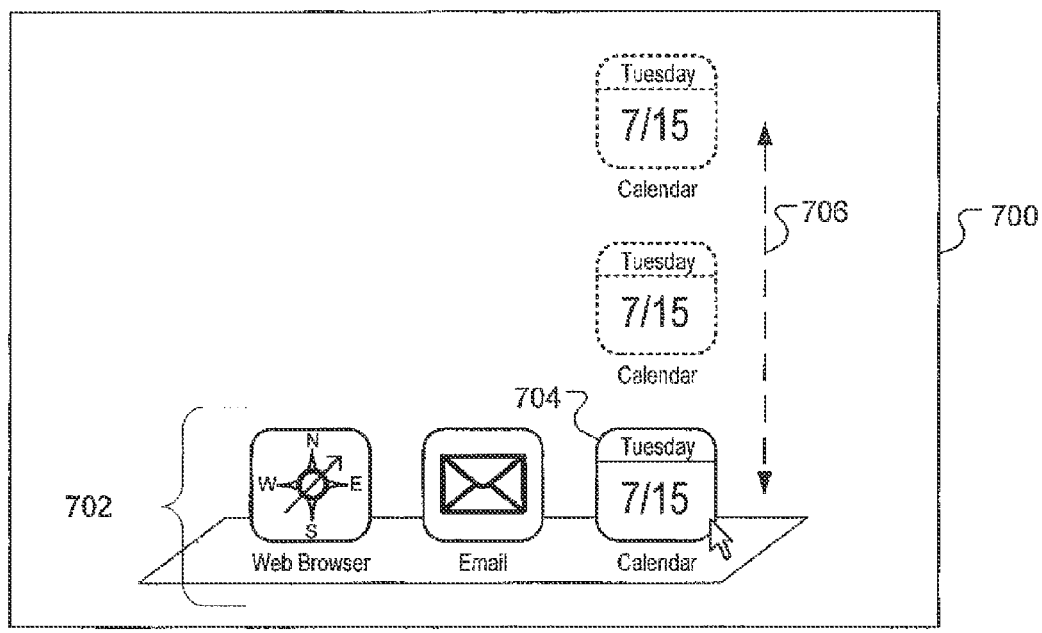
FIGS. 7A-7C illustrates an example desktop user interface and example intensity graphs of light effects, where the intensities of the light effects simulate the bouncing of an application icon.
Figure 7B:
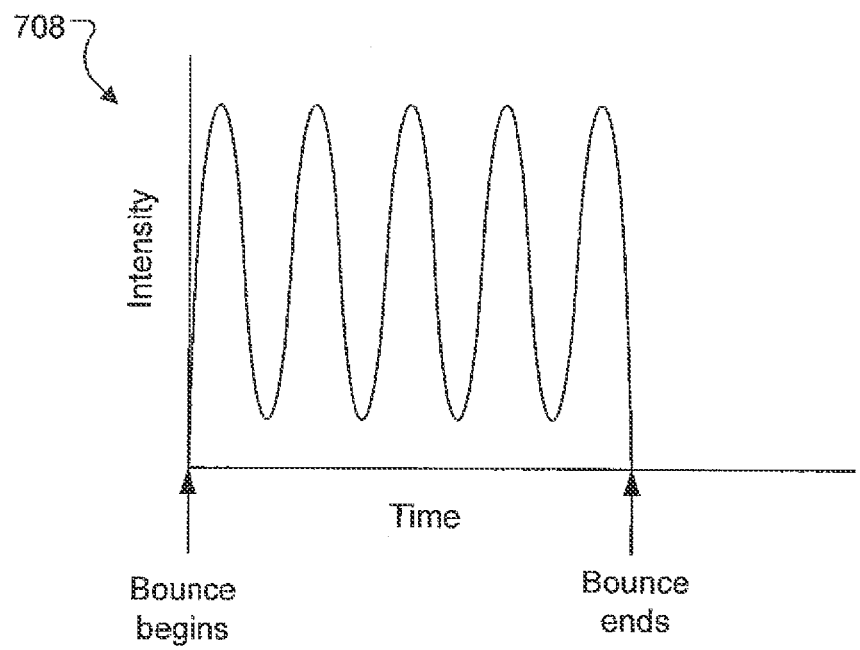
Figure 7C:
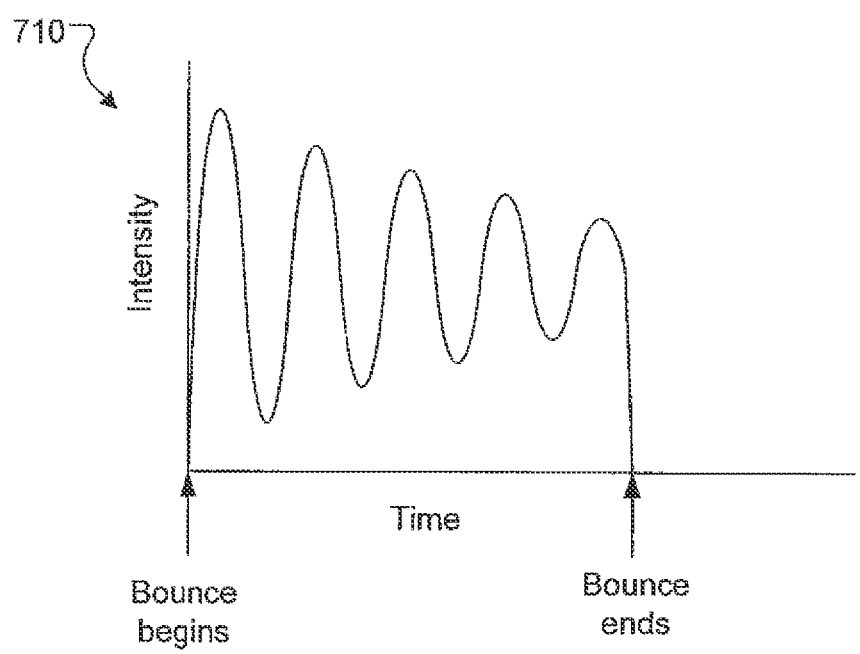

FIGS. 7A-7C illustrates an example desktop user interface 700 and an example intensity graph of a light effect, where the intensity of the light simulates the bouncing of an application icon. FIG. 7A shows a portion of a desktop user interface 700. The desktop user interface 700 can include one or more graphical objects or icons 702 corresponding to respective applications. For example, the desktop 700 includes an icon for a web browser application, an icon for an email application, and an icon for a calendar application. When a user selects an icon 702 to load a corresponding application, the icon can be displayed with a bouncing dynamic on a display. For example, when the user selects the calendar application icon 704, the calendar application icon can bounce up and down, as indicated by the bi-directional arrow 706. A light effect emitted by the light emission module can simulate the bouncing dynamic, changing intensity with the bounce, as illustrated by intensity graph 708 in FIG. 7B. The intensity reaches a peak when the icon reaches the peak of the bounce, and the intensity reaches a crest when the icon reaches the crest of the bounce. The intensity continues oscillating between the peak and crest until the bouncing dynamic stops. In some implementations, the maximum height of the icon bounce decreases as time elapses since the selection of the icon. This can be simulated by the light effect that has a damped oscillating intensity, as illustrated by intensity graph 710 in FIG. 7C.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
    detecting, by a first device communicably coupled to a second device, an event associated with the first device;
    in response to the event, producing, by the first device, a sensory output indicating the event;
    determining, by the first device, an operation corresponding to the event that is to be performed by the second device; and
    transmitting, by the first device, instructions to the second device to perform the operation corresponding to the event, wherein the operation is performed concurrently with the sensory output produced by the first device.

2. The method of claim 1, wherein the sensory output comprises graphical user interface information displayed on a display of a device.

3. The method of claim 2, wherein the operation corresponding to the event comprises providing a visual indication that changes corresponding to an on screen dynamic of the graphical user interface information.

4. The method of claim 3, wherein providing the visual indication comprises emitting light, wherein at least one of intensity or color of the emitted light over time simulates the on screen dynamic of the graphical user interface information.

5. The method of claim 1, wherein the sensory output comprises an audio output.

6. The method of claim 5, wherein the operation corresponding to the event comprises providing a visual indication that changes corresponding to at least one of an amplitude or a frequency of the audio output.

7. The method of claim 6, wherein providing the visual indication comprises emitting light, wherein at least one of intensity or color of the emitted light over time varies with the audio output.

8. The method of claim 1, wherein the event includes one of loading an application, a file operation, sending of an email message, search in a search engine, wireless network discovery, password entry, a user-initiated task, or a system event.

9. A first device, comprising:
an interface to a second device;
one or more processors;
a storage medium; and
instructions stored in the storage medium and configured for execution by the one or more processors, the instructions configured to cause the one or more processors to perform operations comprising:
detecting an event associated with the first device;
in response to the event, producing, by the device, a sensory output indicating the event;
determining, by the first device, an operation corresponding to the event that is to be performed by the second device; and
transmitting, by the first device and through the interface, instructions to the second device to perform the operation corresponding to the event, wherein the operation is performed concurrently with the sensory output produced by the first device.

10. The device of claim 9, further comprising a display device; and
wherein the sensory output comprises graphical user interface information displayed on a display of a device.

11. The device of claim 10, wherein the operation corresponding to the event comprises providing a visual indication that changes corresponding to an on-screen dynamic of the graphical user interface information.

12. The device of claim 11, wherein providing the visual indication comprises emitting light, wherein at least one of intensity or color of the emitted light over time simulates the on-screen dynamic of the graphical user interface information.

13. The device of claim 9, wherein the sensory output comprises an audio output from the device.

14. The device of claim 13, wherein the operation corresponding to the event comprises providing a visual indication that changes corresponding to at least one of an amplitude or a frequency of the audio output.

15. The device of claim 9, wherein the event includes one of loading an application, a file operation, sending of an email message, search in a search engine, wireless network discovery, password entry, a user-initiated task, or a system event.

16. A non-transitory computer program product, encoded on a machine-readable storage device or substrate, operable to cause a data processing apparatus to perform operations comprising:
detecting an event associated with a first device, wherein the first device is communicably coupled to a second device;
in response to the event, producing, by the first device, a sensory output indicating the event;
determining, by the first device, an operation corresponding to the event that is to be performed by the second device; and
transmitting, from the first device to the second device, instructions to perform the operation corresponding to the event, wherein the operation is performed concurrently with the sensory output produced by the first device.

17. The non-transitory computer program product of claim 16, wherein the sensory output comprises graphical user interface information displayed on a display.

18. The non-transitory computer program product of claim 17, wherein the operation corresponding to the event comprises providing a visual indication that changes corresponding to an on-screen dynamic of the graphical user interface information.

19. The non-transitory computer program product of claim 18, wherein providing the visual indication comprises emitting light, wherein at least one of intensity or color of the emitted light over time simulates the on-screen dynamic of the graphical user interface information.

20. The non-transitory computer program product of claim 16, wherein the sensory output comprises an audio output.

21. The non-transitory computer program product of claim 20, wherein the operation corresponding to the event comprises providing a visual indication that changes corresponding to at least one of an amplitude or a frequency of the audio output.

22. The non-transitory computer program product of claim 16, wherein the event includes one of loading an application, a file operation, sending of an email message, search in a search engine, wireless network discovery, password entry, a user-initiated task, or a system event.

23. A system, comprising:
means for detecting, by a first device communicably coupled to a second device, an event associated with the first device;
in response to the event, means for producing, by the first device, a sensory output indicating the event;
means for determining, by the first device, an operation corresponding to the event that is to be performed by the second device; and
means for transmitting, by the first device, instructions to the second device to perform the operation corresponding to the event, wherein the operation is performed concurrently with the sensory output produced by the first device.

24. A method comprising:
detecting, by a first device, an event associated with the first device, wherein the first device is communicably coupled to a second device;
interrupting, by the first device, a normal mode of operation and switching to an event mode of operation, where the normal mode is associated with conveying basic device information while the event mode is associated with conveying information corresponding to the detected event;
determining, by the first device, a characteristic of the detected event; and
in response to switching to the event mode of operation, transmitting, by the first device, instructions to the second device to perform an operation corresponding to the determined characteristic of the detected event, wherein the operation is performed concurrently with conveying information corresponding to the detected event by the first device.

* * * * *